United States Patent
Bellert

(10) Patent No.: US 10,410,386 B2
(45) Date of Patent: Sep. 10, 2019

(54) TABLE CELL VALIDATION

(71) Applicant: Konica Minolta Laboratory U.S.A., Inc., San Mateo, CA (US)

(72) Inventor: Darrell Eugene Bellert, Boulder, CO (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 221 days.

(21) Appl. No.: 15/706,072

(22) Filed: Sep. 15, 2017

(65) Prior Publication Data

US 2019/0087988 A1    Mar. 21, 2019

(51) Int. Cl.

| | |
|---|---|
| *G06T 7/13* | (2017.01) |
| *G06T 7/162* | (2017.01) |
| *G06T 7/73* | (2017.01) |
| *G06K 9/00* | (2006.01) |
| *G06T 11/20* | (2006.01) |
| *G06T 3/60* | (2006.01) |
| G06T 7/62 | (2017.01) |
| G06T 11/60 | (2006.01) |

(52) U.S. Cl.
CPC ............. *G06T 11/206* (2013.01); *G06K 9/00* (2013.01); *G06T 3/60* (2013.01); *G06T 7/13* (2017.01); *G06T 7/162* (2017.01); *G06T 7/73* (2017.01); *G06T 11/203* (2013.01); *G06T 7/62* (2017.01); *G06T 11/60* (2013.01); *G06T 2207/30176* (2013.01)

(58) Field of Classification Search
None
See application file for complete search history.

(56) References Cited

U.S. PATENT DOCUMENTS

| | | | | |
|---|---|---|---|---|
| 6,125,204 | A  * | 9/2000 | Nakatsuka | G06K 9/00456 382/173 |
| 6,173,073 | B1 * | 1/2001 | Wang | G06K 9/00449 382/171 |
| 2007/0140565 | A1 * | 6/2007 | Lin | G06K 9/00416 382/203 |
| 2007/0140566 | A1 * | 6/2007 | Lin | G06K 9/00416 382/203 |
| 2010/0246958 | A1 * | 9/2010 | Ma | G06K 9/00456 382/176 |

* cited by examiner

*Primary Examiner* — Bernard Krasnic
(74) *Attorney, Agent, or Firm* — Osha Liang LLP

(57) ABSTRACT

A method for processing an image that includes a table is provided. The method includes: obtaining a set of edges associated with a cell candidate of the table; determining a longest edge in the set of edges and a first orientation of the longest edge; determining, in the set of edges, an initial edge for a first cell border comprising the first orientation and the longest edge; building the first cell border based on the initial edge, the first orientation, and the set of edges; calculating a second orientation for a second cell border by rotating the first orientation; building the second cell border based on an initial edge for the second cell border and the second orientation; and validating the cell candidate as a cell of the table in response to building the first cell border and building the second cell border.

17 Claims, 13 Drawing Sheets

| local oriented edges: | (11, 15) | (15, 14) | (14, 20) |

FIG. 4E ← Local oriented edges data structure 450

Northern edges data structure 451

Eastern edges data structure 453

| Northern edges: | (11, 15) | (15, 14) | |
|---|---|---|---|
| Eastern edges: | (14, 20) | (20, 21) | (21, 25) |
| Southern edges: | (25, 30) | (30, 37) | |
| Western edges: | (27, 28) | (28, 23) | (23, 11) |

Southern edges data structure 455

Western edges data structure 457

FIG. 4F

TABLE CELL VALIDATION

BACKGROUND

An image may include a table with rows and columns bounded by hand-drawn lines. For example, the image may be a scan of a hand-drawn page. As another example, the image may be a photograph of a writing board on which a table has been drawn with markers. These hand-drawn lines are rarely straight, making it difficult for image processing devices to determine the geometry of the table (e.g., upper left corner, extents, number of rows and columns, cell positions). These hand-drawn lines also make it difficult to generate a high-level representation of the table that can be included in an electronic document (e.g., word processing document, spreadsheet, slide show, webpage, etc.). Regardless, users still wish to have image processing devices operate on hand-drawn tables or any table in an image.

SUMMARY

In general, in one aspect, the invention relates to a method for processing an image that includes a table. The method comprises: obtaining a set of edges associated with a cell candidate of the table; determining a longest edge in the set of edges and a first orientation of the longest edge; determining, in the set of edges, an initial edge for a first cell border comprising the first orientation and the longest edge; building the first cell border based on the initial edge, the first orientation, and the set of edges; calculating a second orientation for a second cell border by rotating the first orientation; building the second cell border based on an initial edge for the second cell border and the second orientation; and validating the cell candidate as a cell of the table in response to building the first cell border and building the second cell border.

In general, in one aspect, the invention relates to a system for processing an image that includes a table. The system comprises: a memory; and a computer processor connected to the memory that: obtains a set of edges associated with a cell candidate of the table; determines a longest edge in the set of edges and a first orientation of the longest edge; determines, in the set of edges, an initial edge for a first cell border comprising the first orientation and the longest edge; builds the first cell border based on the initial edge, the first orientation, and the set of edges; calculates a second orientation for a second cell border by rotating the first orientation; builds the second cell border based on an initial edge for the second cell border and the second orientation; and validates the cell candidate as a cell of the table in response to building the first cell border and building the second cell border.

In general, in one aspect, the invention relates to a non-transitory computer readable medium (CRM) storing computer readable program code for processing an image that includes a table embodied therein. The program code, when executed: obtains a set of edges associated with a cell candidate of the table; determines a longest edge in the set of edges and a first orientation of the longest edge; determines, in the set of edges, an initial edge for a first cell border comprising the first orientation and the longest edge; builds the first cell border based on the initial edge, the first orientation, and the set of edges; calculates a second orientation for a second cell border by rotating the first orientation; builds the second cell border based on an initial edge for the second cell border and the second orientation; and validates the cell candidate as a cell of the table in response to building the first cell border and building the second cell border.

Other aspects of the invention will be apparent from the following description and the appended claims.

BRIEF DESCRIPTION OF DRAWINGS

FIGS. 4A-4G show an implementation example in accordance with one or more embodiments of the invention.

DETAILED DESCRIPTION

Figure 1:
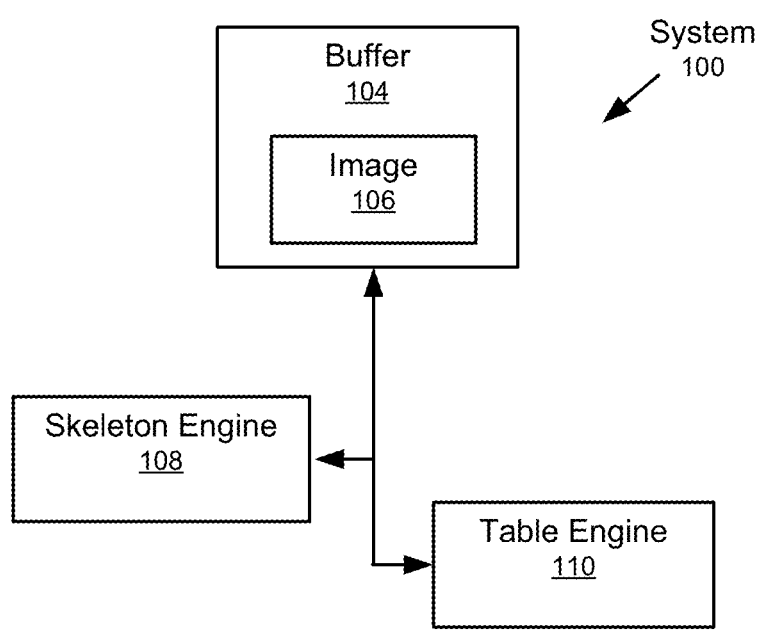
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of image processing for detecting cells in a hand-drawn table. Specifically, an image including a table with one or more cells is obtained. The image is converted into a mask, and a skeleton graph that includes edges and vertices representing the table is generated. Candidate cells are identified based on the edges and vertices in the skeleton graph. Then, one or more processes are executed to validate the candidate cells as actual cells of the table. A high-level representation of the table may be generated, based on the validated cells, for inclusion in an electronic document (e.g., OOXML document, PDF document, etc.).

FIG. 1 shows a system (100) in accordance with one or more embodiments of the invention. As shown in FIG. 1, the system (100) has multiple components, including, for example, a buffer (104), a skeleton engine (108), and a table engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an image (106) including a table having any number of rows and columns. Each cell of the table may have text and/or graphics. The image (106) may be obtained (e.g., downloaded, scanned, etc.) from any source. Further, the image (106) may be of any size and in any format (e.g., JPEG, GIF, BMP, PNG, etc.). In one or more embodiments, the image (106) includes a writing board (e.g., blackboard, whiteboard, etc.), and the table is drawn on the writing board with a marker.

In one or more embodiments of the invention, the skeleton engine (108) may be implemented in hardware (i.e., circuitry), software, or any combination thereof. The skeleton engine (108) converts the image (106) to a mask (e.g., a binary image) in order to facilitate the identification of hand-drawn lines in the table and/or text characters in the table.

Those skilled in the art, having the benefit of this detailed description, will appreciate that a standard coordinate system for the image (106) may exist. However, if the hand-drawn table is rotated within the image (106), the axes of this standard coordinate system might not align with the rows and columns of the table. In one or more embodiments of the invention, the skeleton engine (108) establishes a custom coordinate system with perpendicular axes that closely align with the rows and columns of the table in the image (106). Alternatively, the image may be rotated to better align the rows and columns of the table with the standard coordinate system of the image (106).

In one or more embodiments of the invention, the skeleton engine (108) generates a skeleton graph for the table in the image (106). The skeleton graph includes a series of edges and vertices that represent the hand-drawn table. Each edge may correspond to a stroke, or a portion of a stroke, of the table and each vertex may correspond to an intersection of two or more edges. In other words, the edges are separated by the vertices. Further, an edge may contain a path of pixels from one end of the stroke to the other end of the stroke, located approximately at the center of the stroke. In one or more embodiments, the width of the path is 1 pixel. In one or more embodiments of the invention, the width of the path is multiple pixels.

In one or more embodiments of the invention, the table engine (110) may be implemented in hardware (i.e., circuitry), software, or any combination thereof. The table engine (110) is configured to detect the cells in the table. In other words, the table engine (110) is configured to identify the edges and vertices that form the cells of the table.

In one or more embodiments of the invention, the table engine (110) starts by executing one or more processes on the skeleton graph to identify candidate cells, with each candidate cell being a set of edges and vertices. Then, the table engine (110) executes one or more validation processes on each candidate cell to confirm the candidate cell is actually a cell of the table and should be included in any high-level representation of the table.

In one or more embodiments of the invention, the validation process or processes includes an initialization phase. During the initialization phase, the table engine (110) is configured to determine the longest edge in the candidate cell, to determine the orientation of the longest edge (e.g., NORTH), and to determine the initial edge in the border (i.e., a subset of the edges that share the same orientation as the longest edge) of the candidate cell having the longest edge.

In one or more embodiments, determining the initial edge of the border may include tracing the preceding edges of the longest edge in a direction of the table (i.e., clockwise or counter-clockwise) until finding an edge that exceeds a minimum length threshold and that has an orientation that is +/−90 degrees from the orientation of the longest edge. In one or more embodiments, the minimum length threshold value may be computed as twice the average width, in pixels, of all strokes in the table. For example, assume that the longest edge has an orientation of NORTH and the direction of the trace is counter-clockwise. The table engine (110) traces all edges preceding the longest edge in the counter-clockwise direction until an edge that exceeds the minimum length threshold and that has an orientation of WEST is detected. If this edge with an orientation of WEST is a short edge (i.e., an edge shorter than the minimum length threshold value), the table engine (110) resumes the trace until an edge with an orientation of WEST that is longer than the minimum length threshold is detected. This will be described in more detail below in FIGS. 2A-2C.

Then, the table engine (110) sets the detected edge as the starting edge and the longest edge as the ending edge. The table engine (110) searches, in the direction beginning from the starting edge and until arriving at the ending edge, for an edge sharing the orientation of the longest edge that has a vertex forming a corner of the candidate cell. This will be described in more detail below in FIG. 4C.

In one or more embodiments of the invention, the table engine (110) sets the edge that forms the corner of the candidate cell as the initial edge of the border that includes longest edge. For example, assume that the longest edge has an orientation of NORTH. The edge that forms a corner of the cell is set as the initial edge of the NORTH border of the candidate cell (i.e., initial edge of the northern cell border).

In one or more embodiments of the invention, in the event that the table engine (110), while tracing the preceding edges of the longest edge, returns to the longest edge before finding an edge that exceeds a minimum length threshold and that has an orientation that is +/−90 degrees from the orientation of the longest edge, then the set of edges is discarded from further consideration (i.e., the candidate cell is not valid).

In one or more embodiments of the invention, in the event that the table engine (110) determines that an edge preceding the longest edge has an orientation that is +/−180 degrees of the orientation of the longest edge, the table engine (110) discards the set of edges and the process ends (i.e., the candidate cell is not valid). For example, assume that the longest edge has an orientation of NORTH and the edge with the first change in orientation preceding the longest edge has an orientation of SOUTH. The set of edges is discarded because the change from NORTH to SOUTH is 180 degrees and exceeds the maximum allowable change in orientation (i.e., +/−90 degrees).

In one or more embodiments of the invention, following the initialization phase, the table engine (110) executes a border building process to recreate each border of the candidate cell. In other words, execution of the border building process is attempted four times for each candidate cell (i.e., once for each cardinal direction). The border building process is first executed to build the border that has the longest edge. The output of the border building process includes a subset of the edges that form the border, and the initial edge of the next border (i.e., the border with an orientation that is +/−90 degrees of the orientation of the border that was just constructed).

In one or more embodiments of the invention, the border building process includes tracing the set of edges starting from the initial edge of the border being built until detecting an edge with a +/−90 degrees change in orientation and a length that exceeds the minimum length threshold. In the event that the change in orientation exceeds +/−90 degrees, the set of edges is discarded from further consideration. The table engine (110) stores each encountered edge, including the initial edge, the longest edge, and the edge with the change in orientation, in a local oriented edge data structure. In one or more embodiments, a separate local oriented edges data structure is created for each border of the candidate cell.

In one or more embodiments, the border building process also includes determining if any edge in the local orientated edges data structure exceeds the minimum length threshold and includes a vertex having a degree of 3 or higher. In the event that more than one edge stored in the local oriented edges data structure includes a vertex having a degree of 3 larger and/or in the event that no edges in the data structure include a vertex having a degree of 3 or larger, the table engine (110) selects the first edge in the local oriented edges data structure with an orientation different from the orientation of the border being constructed. The selected edge is removed from the local oriented edges data structure for the border being constructed, as are any additional edges having the different orientation, and is set as the initial edge of the border of the candidate cell in the next orientation (i.e., next cardinal direction from the cardinal direction of the orientation of the longest edge in the clock-wise or counter-clockwise direction).

In one or more embodiments of the invention, the border building process maintains a visited edge count. The visited edge count is incremented, following each execution of the border building process, by the cardinality of the local oriented edges data structure (i.e., the number of edges in the local oriented edges data structure). In one or more embodiments, the visited edge count value is compared to the cardinality of the initially-obtained set of edges to determine if all edges in the set of edges have been encountered. After all four borders have been constructed, in the event that the visited edge count does not match the cardinality of the initially-obtained set of edges, the set of edges is discarded from consideration (i.e., the candidate cell is not valid). For example, assume that the cardinality of the initially-obtained set of edges is 10 and the visited edge count value is 10. The set of edges is accepted. As another example, assume that the cardinality of the initially-obtained set of edges is 10 and the visited edge count value is 11 or 9. The set of edges is discarded from further consideration.

In one or more embodiments of the invention, the border building process is repeated to construct the remaining borders of the cell, and will be described in more detail below in FIGS. 2A-2C and 4D-4F.

In one or more embodiments of the invention, in the event that: (a) the visited edge count equals the cardinality of the initially-obtained set of edges; and (b) at least one border of the candidate cell has not yet been built, the candidate cell is deemed invalid. For example, assume that the border with the longest edge has an orientation of NORTH, the cardinality of the initially-obtained set of edges and the visited edge count value are both 10, the direction of the border building process is clockwise, and no edges were encountered for the WEST border of the cell. The set of edges are discarded from further consideration.

In one or more embodiments, the table engine (110) repeats the above process for validating table cells for each candidate cell.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

Figure 2A:
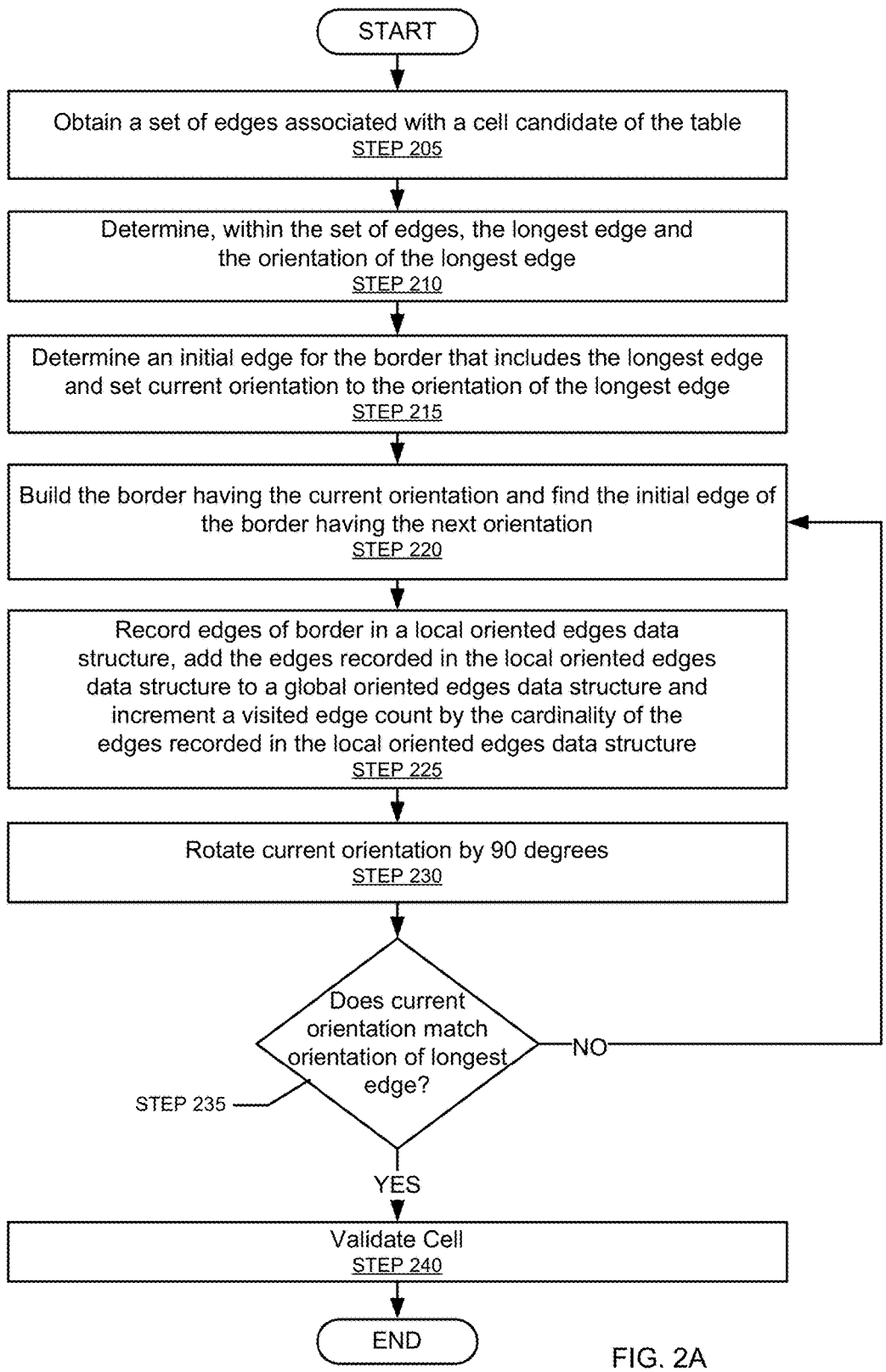
FIG. 2A shows a main flowchart in accordance with one or more embodiments of the invention.
Figure 2B:
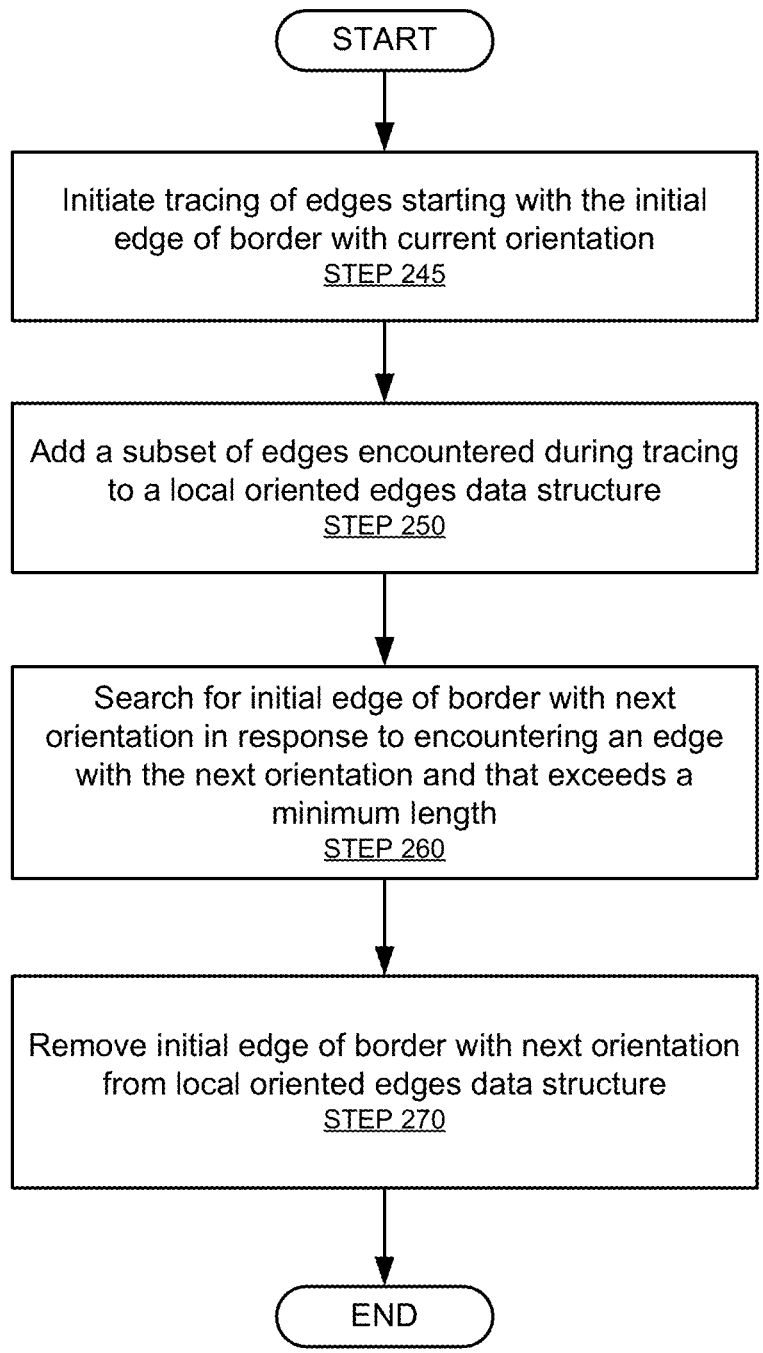
FIGS. 2B and 2C show sub-flowcharts in accordance with one or more embodiments of the invention for steps in the flowchart of FIG. 2A.
Figure 2C:
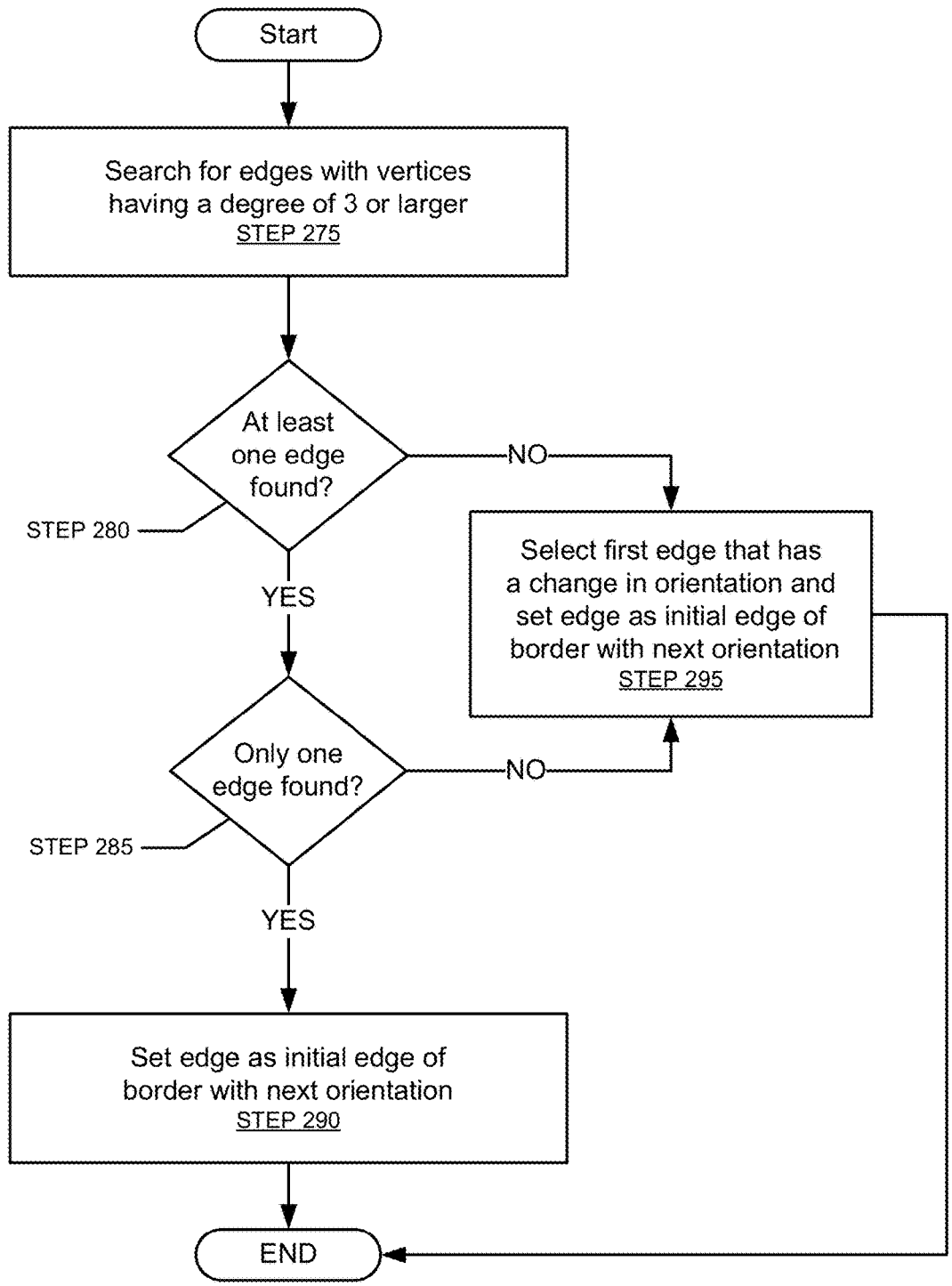

FIGS. 2A-2C show flowcharts in accordance with one or more embodiments of the invention. The flowcharts depict a process for image processing. Specifically, the flowcharts depict a process for validating candidate cells in an image of a table. One or more of the steps in FIGS. 2A-2C may be performed by the components of the system (100), discussed above in reference to FIG. 1. In one or more embodiments of the invention, one or more of the steps shown in FIG. 2A-2C may be omitted, repeated, and/or performed in a different order than the order shown in FIG. 2A-2C. Accordingly, the scope of the invention should not be considered limited to the specific arrangement of steps shown in FIG. 2A-2C.

Referring to FIG. 2A, initially, in STEP 205, a set of edges associated with a cell candidate is obtained for validation. The set of edges has been identified from a skeleton graph for a table in an image. Each edge may correspond to a stroke, or a portion of a stroke, of the table and each vertex may correspond to an intersection of two or more edges. In other words, the vertices separate edges.

In STEP 210, an edge within the set of edges having the longest length is determined. The orientation of the longest edge is also determined. In one or more embodiments of the invention, the length of an edge may be calculated as the Euclidean distance between the two terminal ends of the edge. Additionally or alternatively, the length may also be identified by counting the number of pixels within the edge's path of pixels. Moreover, the orientation of an edge is determined as the cardinal direction in the custom coordinate system that most closely aligns with the normal of the line segment that joins the endpoints of the edge.

In STEP 215, an initial edge for a border of the cell candidate that includes the longest edge is determined and the orientation of the longest edge is set as a current orientation.

In one or more embodiments, determining the initial edge of the border may include tracing the preceding edges of the longest edge in a direction of the table (i.e., clockwise or counter-clockwise) until finding an edge that exceeds a minimum length threshold and that has an orientation that is +/−90 degrees from the orientation of the longest edge. For example, assume that the longest edge has an orientation of NORTH and the direction of the trace is counter-clockwise. All edges preceding the longest edge are traced in the counter-clockwise direction until an edge that exceeds the minimum length threshold and that has an orientation of WEST is detected. If this edge with an orientation of WEST is a short edge (i.e., an edge shorter than the minimum length threshold value), the tracing resumes until an edge with an orientation of WEST that is longer than the minimum length threshold is detected.

In STEP 220, a border building process is initialized to reconstruct (i.e., build) the border having the current orientation and to find an initial edge of a border having the next orientation in the direction (i.e., clockwise or counter-clockwise) of the border building process. This step is further described in more detail in the flowchart described below in reference to FIG. 2B. Specifically, the output of the border building process is a local oriented edges data structure storing the edges that form the border with the current orientation.

In STEP 225, the edges of the border are recorded in a local oriented edges data structure. The set of edges in the local oriented edges data structure are added to (i.e. recorded in) a global oriented edges data structure for the entire candidate cell. Further, the visited edge count value is incremented by the cardinality of the edges in the local oriented edges data structure.

In STEP 230, upon the reconstruction of the border with the current orientation, the current orientation is rotated by 90 degrees and the border building process is repeated to reconstruct the next border of the candidate cell.

In STEP 235, a determination is made to determine if the current orientation matches the orientation of the longest edge. In the event that the current orientation matches the orientation of the longest edge (i.e., YES for the determination in STEP 235) the border building process has been executed four times and thus has reconstructed all four borders of the candidate cell. In such cases, the process proceeds to STEP 240 where the candidate cell is validated using the edges recorded in the four local oriented edges data structures.

In the event that the determination of STEP 235 is NO, the process returns to STEP 220 until there has been an attempt to reconstruct, by the build border process, all four borders of the candidate cell. As discussed above, execution of the border building process is attempted four times for each candidate cell (i.e., once for each cardinal direction).

FIG. 2B shows a sub-flowchart in accordance with one or more embodiments further expanding upon STEP 220 of the flow chart of FIG. 2A. The sub-flowchart in FIG. 2B depicts, at least in part, the border building process. As discussed above, this process may be executed four times (i.e., once for each cardinal direction) to reconstruct the four borders of the candidate cell.

In STEP 245, as described above in reference to FIG. 1, a trace of the edges starting with an initial edge of a border with the current orientation is initialized.

In STEP 250, a subset of edges encountered during the tracing of STEP 245 is added to a local oriented edges data structure.

In STEP 260, an edge that exceeds the minimum length threshold and that has the next orientation is encountered during the tracing. In response, a search for the initial edge of the border with the next orientation (i.e., orientation that is +/−90 degrees of the current orientation) is executed. This step is further described in the flowchart described below in reference to FIG. 2C.

In STEP 270, the initial edge of the border with the next orientation (and any other edge having the next orientation) is removed from the local oriented edges data structure. In one or more embodiments, the only edges remaining in the local oriented edges data structure are the edges that make up one border of the candidate cell.

FIG. 2C shows a sub-flowchart in accordance with one or more embodiments further expanding upon STEP 215 of FIG. 2A and STEP 260 of FIG. 2B. The sub-flowchart in FIG. 2C represents, at least in part, the process that searches for an initial edge of a border of a candidate cell (i.e., an edge at the corner of a border of the candidate cell).

In STEP 275, a search for edges with vertices having a degree of 3 or larger is conducted. In one or more embodiments, the edges being searched may be the set of edges stored in the local oriented edges data structure. Additionally or alternatively, the edge may be all edges encountered during the trace after the longest edge was identified.

In STEP 280, a determination is made to determine whether at least one edge with a vertex having a degree of 3 or larger has been identified.

In the event that the determination in STEP 280 is YES, another determination is made in STEP 285 to determine whether only a single edge with a vertex having a degree of 3 or larger was found in STEP 275.

In the event that the determination in STEP 285 is YES (i.e., only one edge with a vertex having a degree of 3 or larger exists), the edge is selected and set as the initial edge of the border with the next orientation.

In the event that the determination in either STEP 280 or STEP 285 is NO, the process proceeds to STEP 295 where the first edge that has a change in orientation is selected as the initial edge of the border with the next orientation.

Three functions are disclosed below: (i) Main Algorithm; (ii) Find Corner; and (iii) Build Border. Instances of clockwise appearing in the above description of FIGS. 2A-2C and the below three functions may be replaced with counter-clockwise, while instances of counter-clockwise may be replaced with clockwise and instances of right-hand may be replaced with left-hand. The Main Algorithm calls the Build Border function. Both the Main Algorithm and the Build Border function call the Find Corner function. In one or more embodiments of the invention, these three functions are one example of implementing the flowcharts of FIGS. 2A-2C. The Build Border function (below) is the border building process, discussed above, and approximately corresponds to FIG. 2B. The Find Corner function (below) approximately corresponds to FIG. 2C.

Main Algorithm

1. The set of all edges in the cycle (i.e., the candidate cell) are added to a vector of edges named cycle edges.
2. The edge with the longest length is identified as longest edge. This edge will be used as the starting point for validating the cell as it is best to start with edges of significant size.
3. Set current edge to longest edge.
4. The orientation of current edge is identified by seeing where the edge's normal vector lies within the (possibly rotated) cardinal directions (i.e., the custom coordinate system). The normal vector is computed as the right-hand perpendicular vector to the vector that runs from the first vertex in current edge to the second vertex in current edge.
5. Find all previous edges with the same orientation as current edge. This is accomplished by setting last significant edge to current edge and previous edge to the edge prior to current edge. Then, while previous edge is not equal to longest edge, repeat the following steps:
   5.1. Identify the orientation of previous edge and the length of previous edge.
   5.2. If the orientation of previous edge is not the same as the orientation of current edge and the length of previous edge is greater than the min_edge_len threshold (i.e., the minimum length threshold), then:
      5.2.1. If the orientation of previous edge is not the same as one counter-clockwise turn on the compass (e.g. north to west), then the turn to previous edge is too great (e.g. north to south) and the cycle is discarded as not rectangular and the algorithm ends.
      5.2.2. Identify next edge as the edge after last significant edge and set current edge to the result of a function call to FIND_CORNER [detailed below] with the arguments (orientation of previous edge, cycle edges, previous edge and next edge). Go to step 6.
   5.3. If the length of previous edge is greater than the min_edge_len threshold (i.e., the minimum length threshold), then set last significant edge to previous edge.
   5.4. Set previous edge to the edge prior to previous edge.

6. If previous edge is equal to longest edge, then we walked all the way around the cycle backwards without being able to find any good data. The cycle is discarded as not rectangular and the algorithm ends.
7. At this point, current edge should identify the first edge of the border that contains longest edge (i.e., the initial edge of the border that contains the longest edge). The algorithm now walks forward around the cycle, building the 4 borders of the cell if they can be identified. This is done by setting current orientation to the orientation of current edge, setting end orientation to current orientation, and initializing num edges visited to 0. While num edges visited is less than the size of cycle edges, the following steps are repeated:
   7.1. Set a vector of edges named oriented edges to the result of a function call to BUILD_BORDER with the arguments (current orientation, cycle edges, and current edge)
   7.2. If oriented edges is empty, then a border for the current orientation could not be detected. The cycle is discarded as not rectangular and the algorithm ends.
   7.3. Increment num edges visited (i.e., visited edges count) by the number of edges in oriented edges.
   7.4. Record the border edges of the cell for current orientation as oriented edges (i.e., global oriented edges data structure) before the next iteration of the loop.
   7.5. Set current orientation to one clockwise turn of the compass (e.g. north to east).
   7.6. If current orientation is equal to end orientation and num edges visited is less than the total number of edges in the cycle, then the algorithm has already walked around all 4 orientations yet there are still edges remaining. The cycle is discarded as not rectangular and the algorithm ends.
8. If the border edges of the cell for current orientation is empty, then the algorithm failed to find edges on all 4 sides. The cycle is discarded as not rectangular and the algorithm ends.
9. The cycle is accepted as rectangular and the cell has successfully recorded the borders on all 4 sides.

FIND_CORNER(starting orientation, vector of edges, starting edge, ending edge) attempts to locate a corner of a cell that lies between starting edge and ending edge both of which are on vector of edges. The steps of this function are:
1. Build an empty vector of edges named corner candidates (i.e., candidate for the initial edge of the border with the next orientation).
2. Set corner to the edge following starting edge.
3. Find potential edges that are candidates to be a corner (i.e., candidate for the initial edge of the border with the next orientation). Set e to corner and while e does not equal ending edge:
   3.1. If the degree of the first vertex of e is 3 or more, then add e to corner candidates.
   3.2. Increment e by one edge.
4. If corner candidates is empty, then:
   4.1. There were no vertices with degree 3 or more, so just select the first edge that makes an orientation change by incrementing corner while corner is not equal to ending edge and the orientation of corner is equal to starting orientation.
5. Else if corner candidates has exactly one entry:
   5.1. Set corner (i.e., initial edge of the border with the next orientation) to the single entry in corner candidates.
6. Else:
   6.1. There are multiple vertices with degree 3 or more, so just select the first edge that makes an orientation change by incrementing corner while corner is not equal to ending edge and the orientation of corner is equal to starting orientation.
7. Return corner (i.e., initial edge of the border with the next orientation).

BUILD_BORDER(border orientation, vector of edges, current edge) attempts to build a single border beginning with current edge on vector of edges with an orientation of border orientation. The steps of this function are:
1. Create an empty vector of edges named local oriented edges.
2. Set local last significant edge to current edge (i.e., initial edge of the border with the current orientation).
3. Repeat while the size of local oriented edges is less than the size of vector of edges:
   3.1. Add current edge (i.e., initial edge of the border with the current orientation) to local oriented edges.
   3.2. Set current orientation to the orientation of current edge (i.e., initial edge of the border with the current orientation) and current length to the length of current edge (i.e., initial edge of the border with the current orientation).
   3.3. Set current edge to the edge after current edge (i.e., set the current edge to the edge proceeding the current edge).
   3.4. If current orientation equals one clockwise turn of border orientation (i.e., if a 90 degree change in orientation has been detected) and current length is greater than the min_edge_len threshold (i.e., the edge exceeds a minimum length threshold), then the orientation has changed with a significant edge. Try to locate the corner (i.e., initial edge of the border with the next orientation):
      3.4.1. Set corner (i.e., initial edge of the border with the next orientation) to the result of a function call to FIND_CORNER with the arguments (border orientation, local oriented edges, local last significant edge, and the end of local oriented edges).
      3.4.2. Remove all edges in local oriented edges that occur from corner and beyond. (i.e., edge of the border with the next orientation)
      3.4.3. Set current edge to corner (i.e., set edge with the change of orientation to the initial edge of the border with the next orientation).
      3.4.4. Return local oriented edges.
   3.5. If current length is greater than the min_edge_len threshold, then set local last significant edge to the last entry in local oriented edges.
4. Return an empty local oriented edges.

Figure 3A:
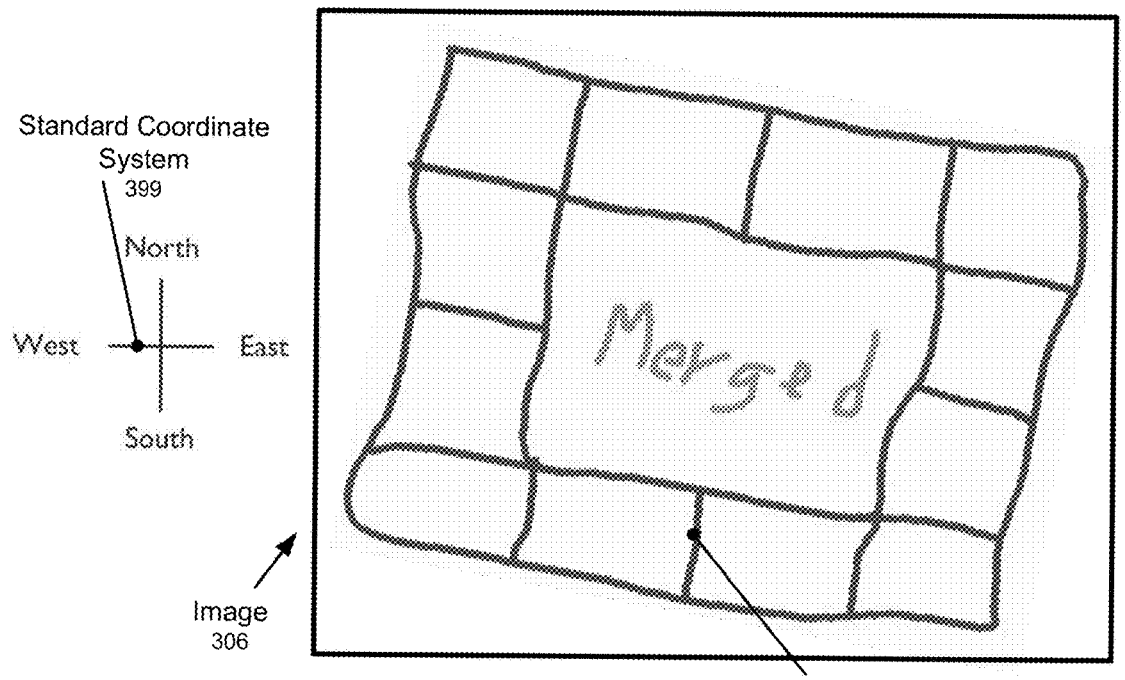
FIGS. 3A-3C show an implementation example in accordance with one or more embodiments of the invention.
Figure 3B:
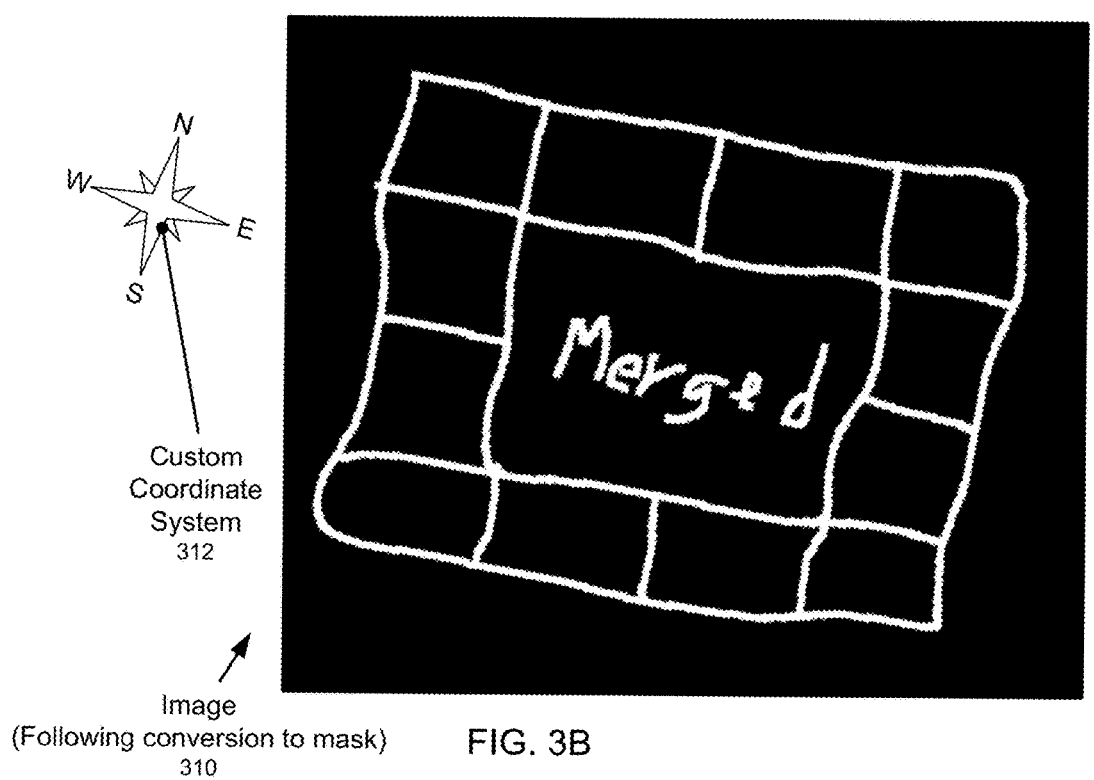
Figure 3C:
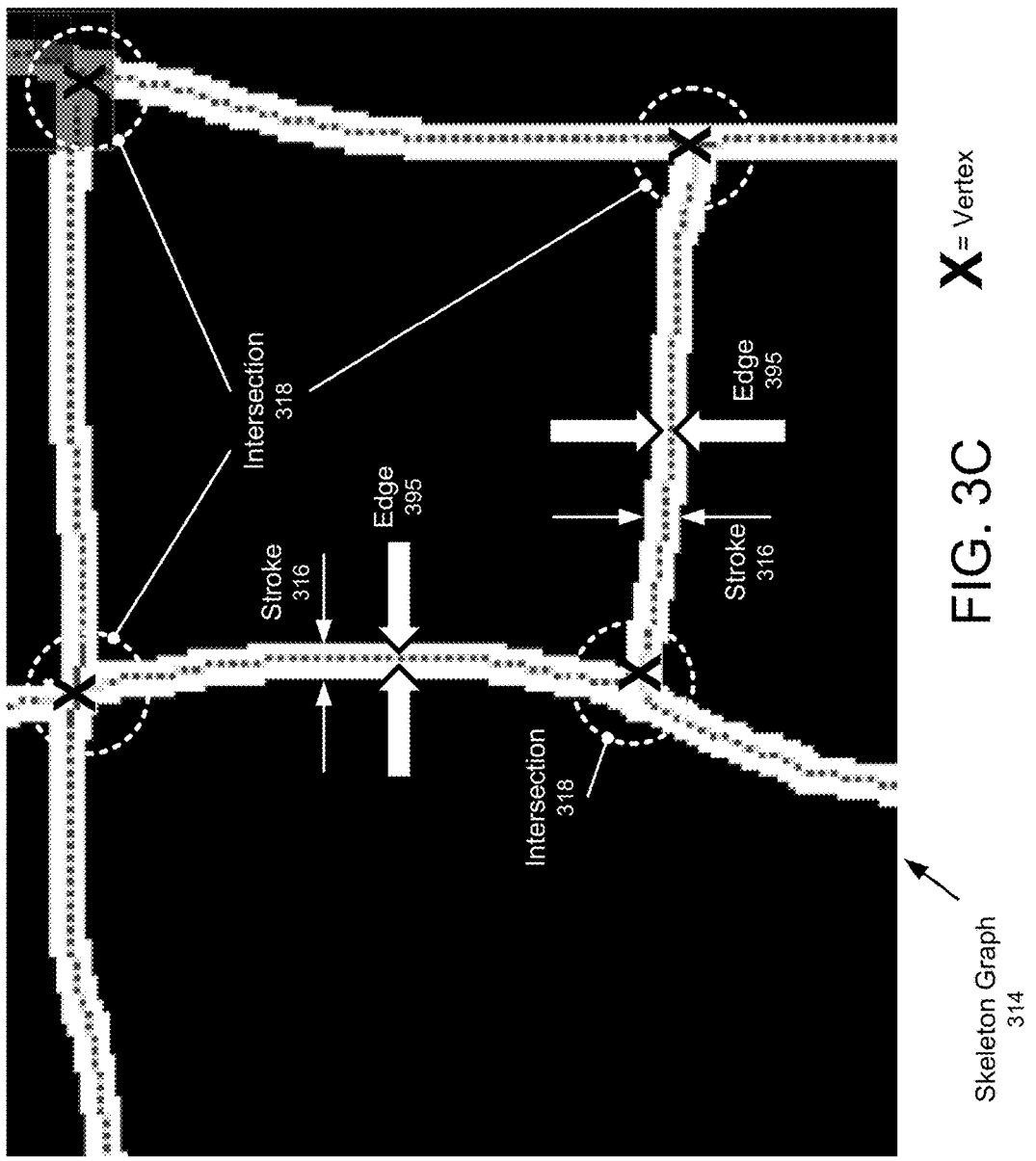

FIGS. 3A-3C show an implementation example in accordance with one or more embodiments of the invention. FIG. 3A shows an image (306) with a hand-drawn table (308). Specifically, the table (308) includes hand-drawn stokes that form the rows and columns. One or more cells of the table (308) may include text. Alternatively, one or more of the cells of the table may be merged. The hand-drawn table (308) may be drawn at an angle. In other words, the table (308) is not aligned with the standard coordinate system (399) for the image (306).

FIG. 3B shows the image (310) after it has been converted to a mask. Moreover, a custom coordinate system (312) has been established. This custom coordinate system (312) has axes that are better aligned with the rows and columns of the table (308) than the standard coordinate system (399).

FIG. 3C shows a partial skeleton graph (314) for the table. As shown in FIG. 3C, the rows and columns of the table are formed by multiple hand-drawn strokes (316). The skeleton graph (314) includes a set of edges (395) and vertices that represent the hand-drawn table. Each edge (395) corresponds to a stroke (316), or a portion of a stroke, of the hand-drawn table and each vertex may correspond to an intersection (318) of two or more edges (395). In other words, the edges (395) are separated by the vertices. Further, each edge (395) contains a path of pixels from one end of the stroke (316) to the other end of the stroke (316), located approximately at the center of the stroke. In FIG. 3C, the width of the path/edge is 1 pixel.

FIGS. 4A-4G show an implementation example in accordance with one or more embodiments of the invention. Instances of clockwise appearing in the below description of FIGS. 4A-4G may be replaced with counter-clockwise, while instances of counter-clockwise may be replaced with clockwise. Specifically, FIGS. 4A-4D and 4G show a partial mask and skeleton graph of a hand-drawn table (401) similar to the image (310) and skeleton graph (314) of hand-drawn table (308), as discussed above in reference to FIGS. 3A-3C. The custom coordinate system (312), as discussed in reference to FIGS. 3A-3C, has been established for the hand-drawn table (401).

Figure 4A:
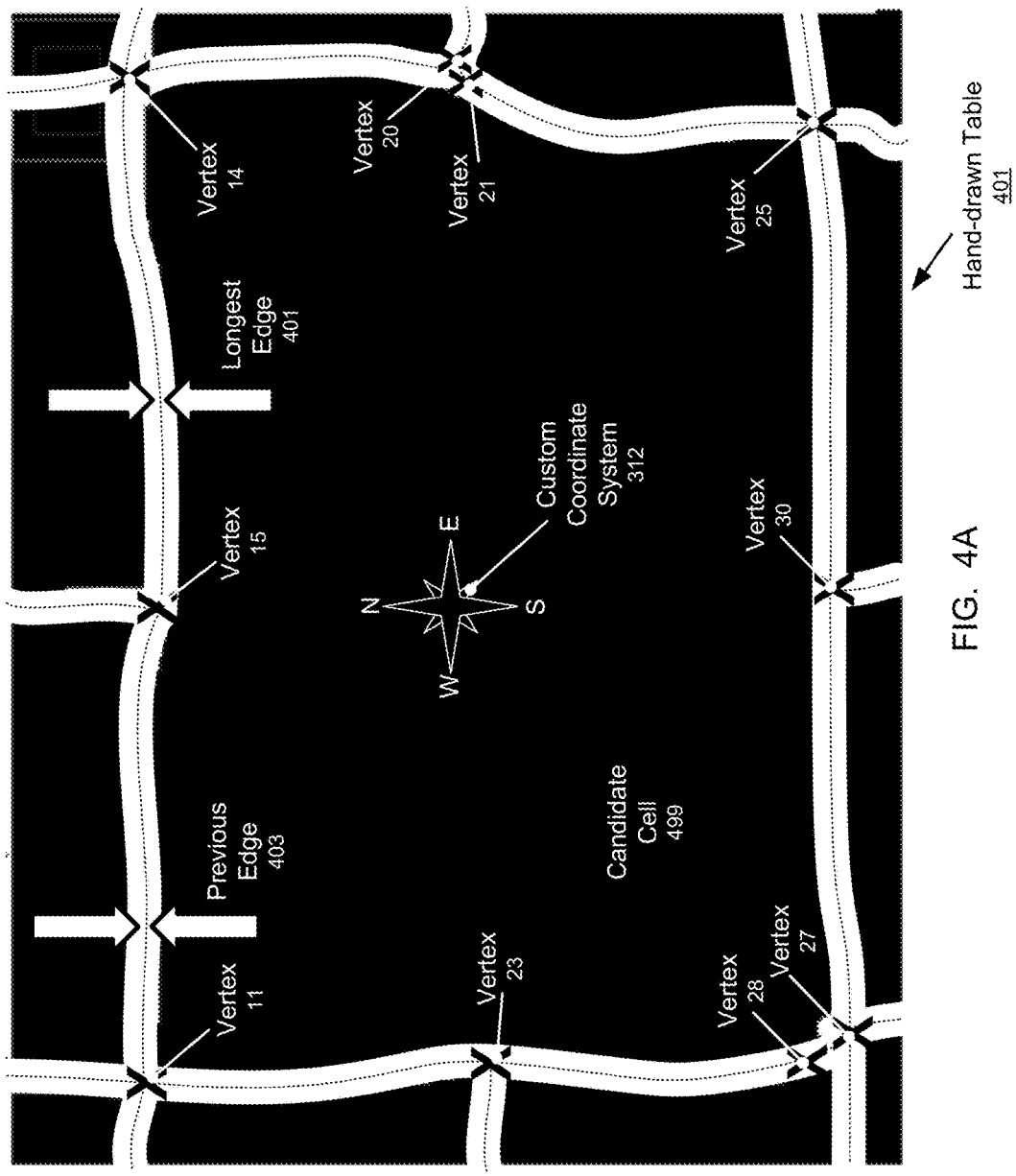
Figure 4B:
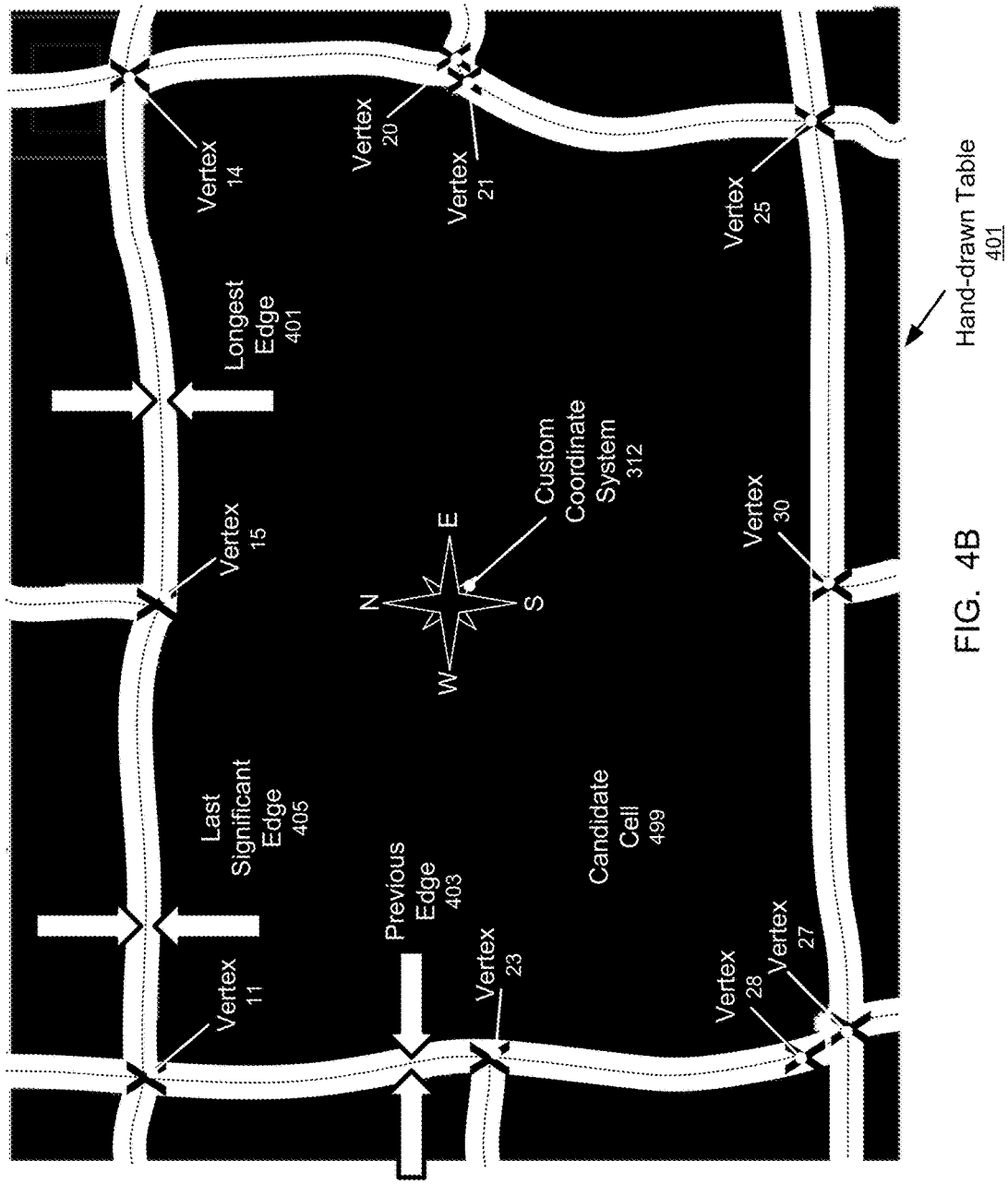
Figure 4C:
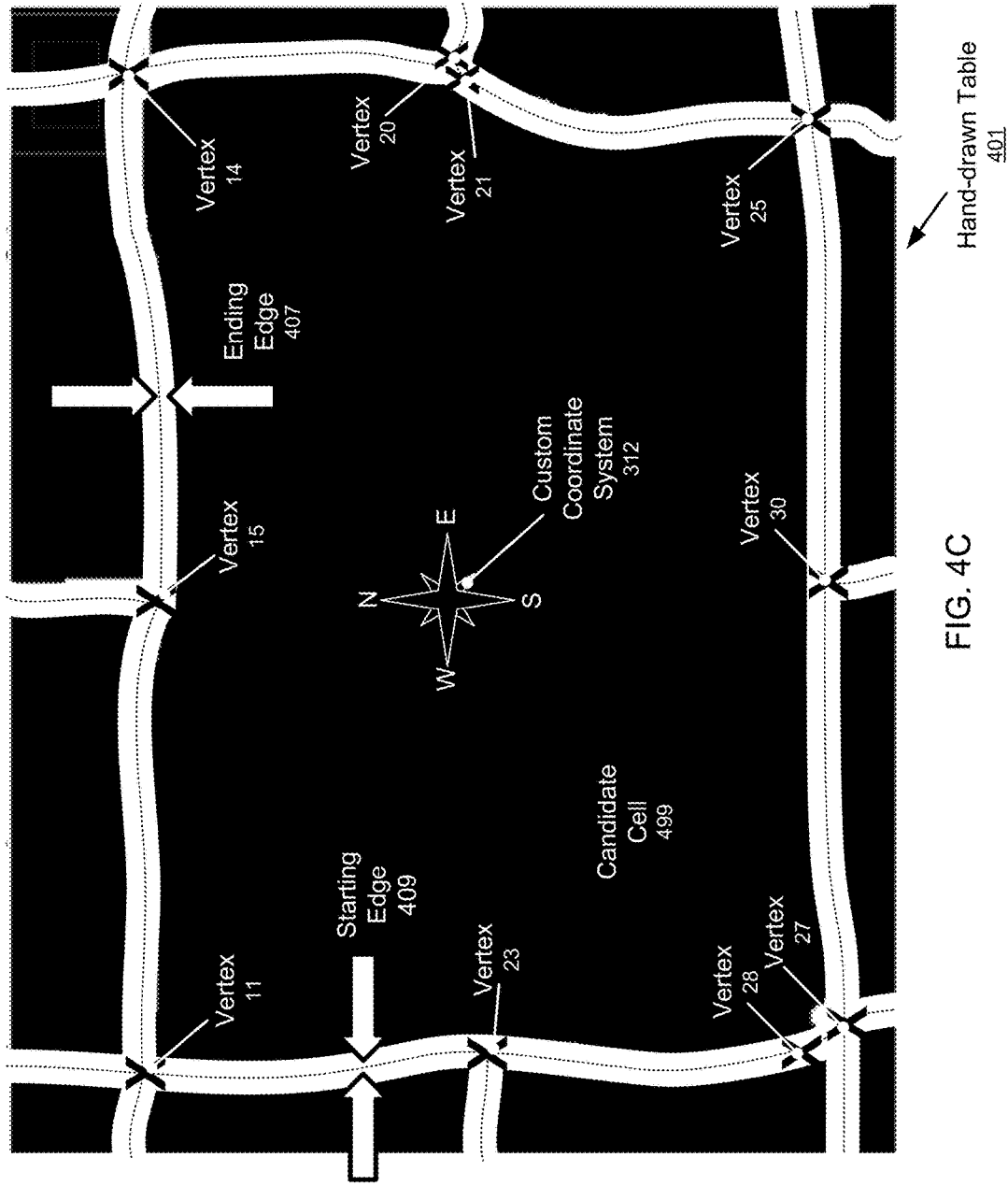

FIGS. 4A-4C show an example of determining the initial edge for the border of the candidate cell with the longest edge. As seen in FIG. 4A, the skeleton graph of the hand-drawn table (401) includes multiple vertices (11, 14, 15, 20, 21, 23, 25, 27, 28, 30) that separate a set of edges that form a candidate cell (499) of the hand-drawn table (401). The longest edge (401) is the edge between vertex (15) and vertex (14) and the longest edge (401) has an orientation of NORTH. As seen in FIG. 4A, the candidate cell (499) includes a cardinality of 10 edges. This is an example of step 5 in the Main Algorithm discussed above in FIGS. 2A-2C, which utilizes the Find Corner function.

In one or more embodiments, a trace of the preceding edges of the longest edge (401) is conducted in the counter-clockwise direction and the first preceding edge encountered is labeled the previous edge (403).

As seen in FIG. 4B, the edge between vertex (15) and vertex (11) (i.e., the previous edge (403) labeled in FIG. 4A) now becomes a last significant edge (405) and the trace of the preceding edges of the longest edge (401) continues and the edge between vertex (11) and (23) is encountered and labeled as the new previous edge (403). At this point, it is determined that the previous edge (403) has an orientation (i.e., WEST) that is different from the NORTH orientation of the longest edge (401) and that the previous edge exceeds a minimum length threshold. In other words, it is determined that a corner of the candidate cell is near.

As seen in FIG. 4C, the edge between vertex (23) and vertex (11) (i.e., the previous edge (403) labeled in FIG. 4B) now becomes starting edge (409) and the longest edge (401) from FIGS. 4A and 4B now becomes the ending edge (407). The cell validation process now attempts to find the initial edge that forms a corner on the NORTH border between the starting edge and the ending edge.

In one or more embodiments, the cell validation process determines that vertex (11) is a vertex having a degree of 4 (i.e., a vertex that connects four edges), and selects the edge between vertex (11) and (15) as the initial edge that forms a corner on the NORTH border between the starting edge and the ending edge.

Figure 4D:
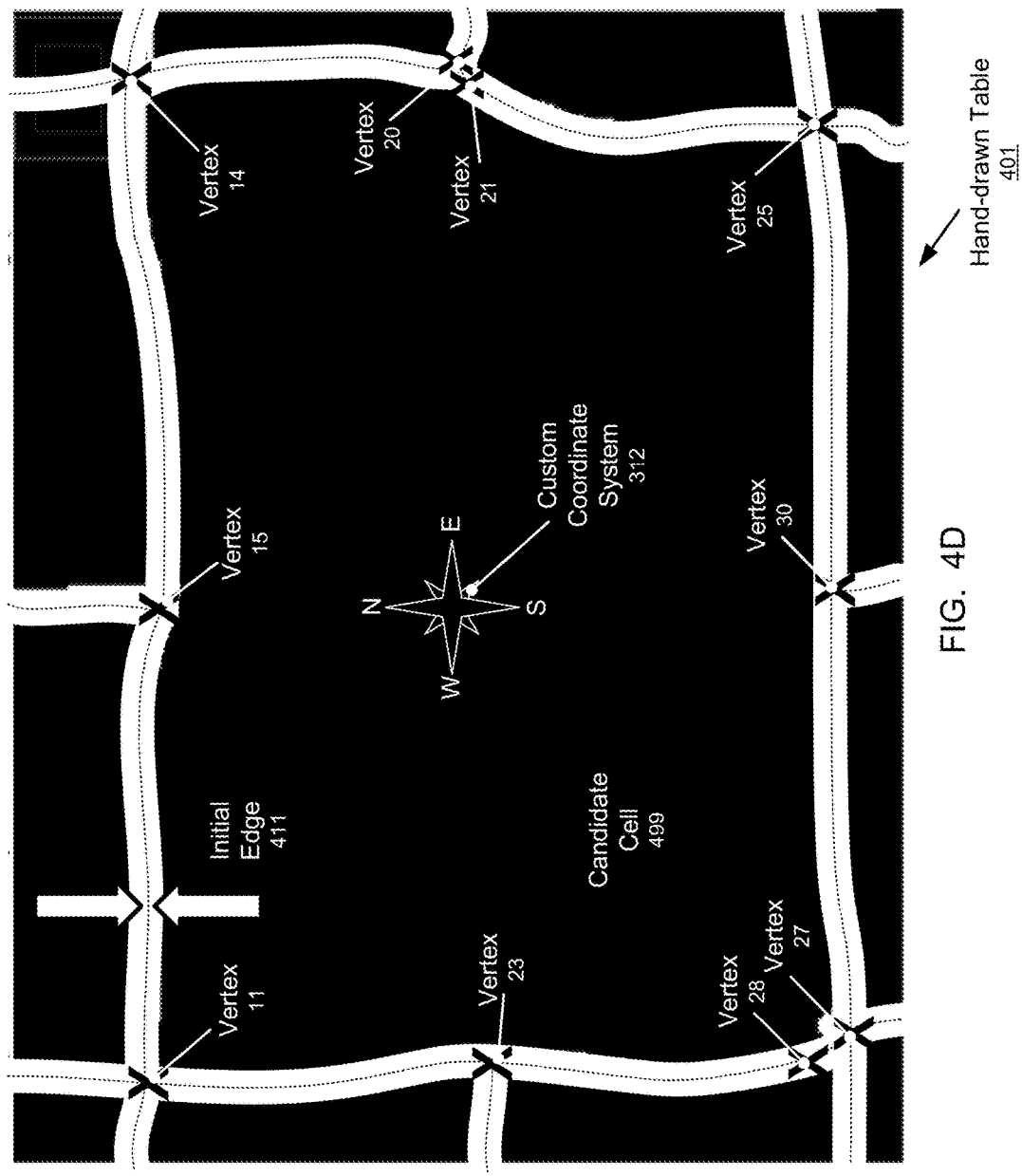
Figure 4G:
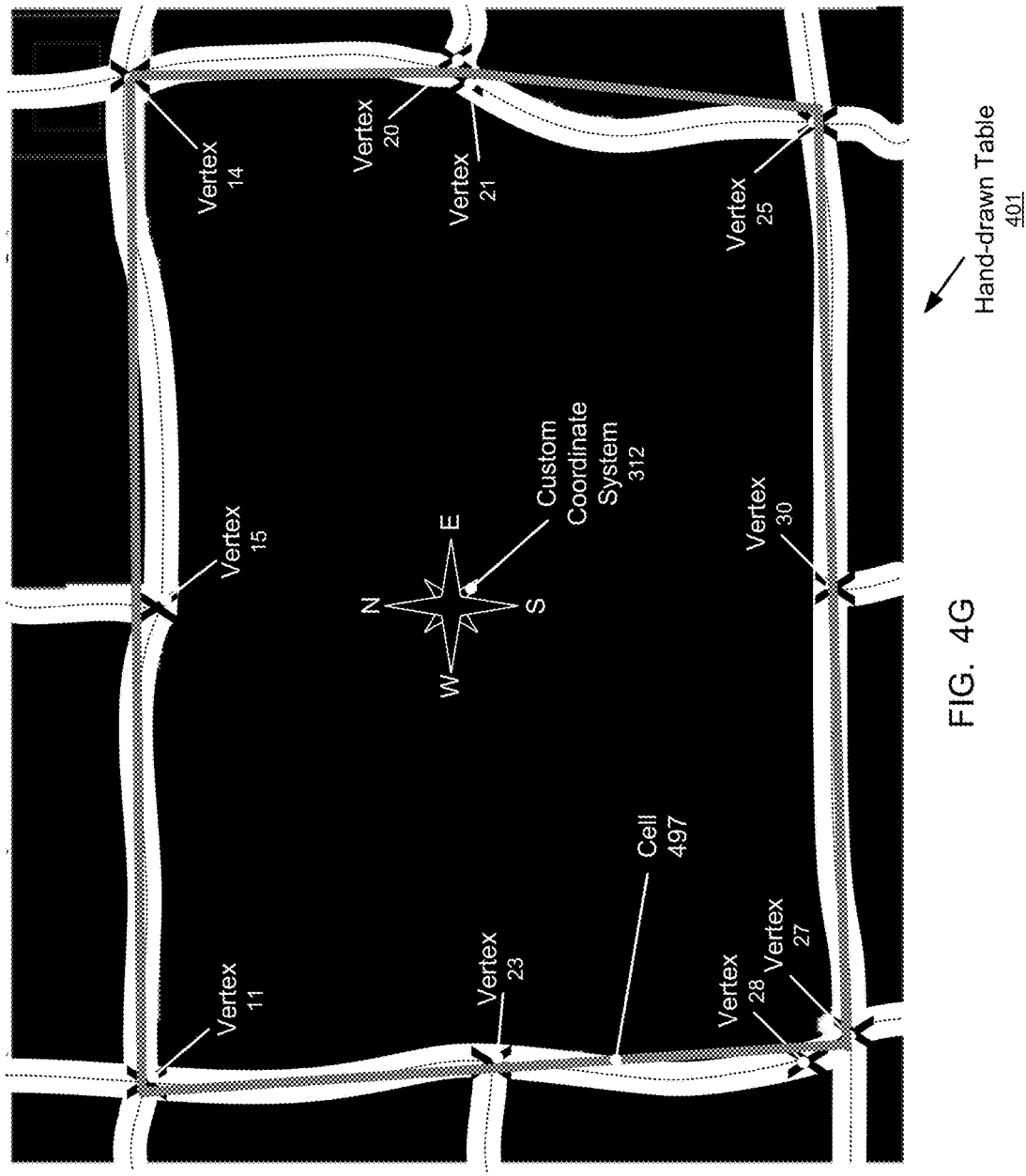

As seen in FIG. 4D, the initial edge (411) of the NORTH border of the candidate cell (499) has been identified using the process described above in FIGS. 4A to 4C and the cell validation process is now able to initialize the border process to construct the four borders of the candidate cell (499). This is an example of the BUILD_BORDER function discussed above in reference to FIGS. 2A-2C.

FIG. 4E shows an example of a local oriented edges data structure (450) constructed during the execution of the border building process to reconstruct the NORTH border of the candidate cell (499) of FIGS. 4A to 4D. As seen in FIG. 4E, the edges are stored in the format of the two vertices that make up the edge (i.e., the edge between vertex (11) and vertex (15) is stored as (11,15)). The local oriented edges data structure of FIG. 4E includes the initial edge (i.e., edge (11,15)), the longest edge (i.e., edge (15,14)), and an edge with a change in orientation (i.e., edge (14, 20)) compared to the orientation of the longest edge. This is an example of the BUILD_BORDER function discussed above in reference to FIGS. 2A-2C.

In one or more embodiments, the edge (14, 20) is removed from the oriented edges data structure (450) and set as the initial edge for the EAST cell border of the candidate cell (499) and the border building process is repeated for the EAST cell border.

FIG. 4F shows an example of the local oriented edges data structures (450) of FIG. 4E for each cell border of the candidate cell (499) labeled as northern edges data structure (451), eastern edges data structure (453), southern edges data structure (455), and western edges data structure (457). As seen in FIG. 4F, total number of edges stored in the data structures (451, 453, 455, 457) is 10, which matches the cardinality of the number of edges of the candidate cell (499). Furthermore, the western edges data structure (457) show that edges were encountered on the WEST border of the candidate cell (499). Therefore, the candidate cell (499) is accepted as a near-rectangular cell of the hand-drawn table (401) and illustrated as cell (497) (i.e., cell formed by the edges illustrated by grey lines) in the hand-drawn table (401) of FIG. 4G.

In one or more embodiments, as seen in FIG. 4F, the eastern edge data structure (453) includes the edge (20,21) (i.e., the edge between vertex (20) and (21)). As seen in FIGS. 4A-4D, the edge between vertex (20) and vertex (21) has an orientation of SOUTH, which is the next clockwise cardinal direction of the orientation of the edge between vertex (14) and vertex (20), WEST. However, the edge between vertex (20) and vertex (21) is shorter than a minimum length threshold and as a result, does not get considered as the initial edge of the SOUTH cell border.

Figure 5:
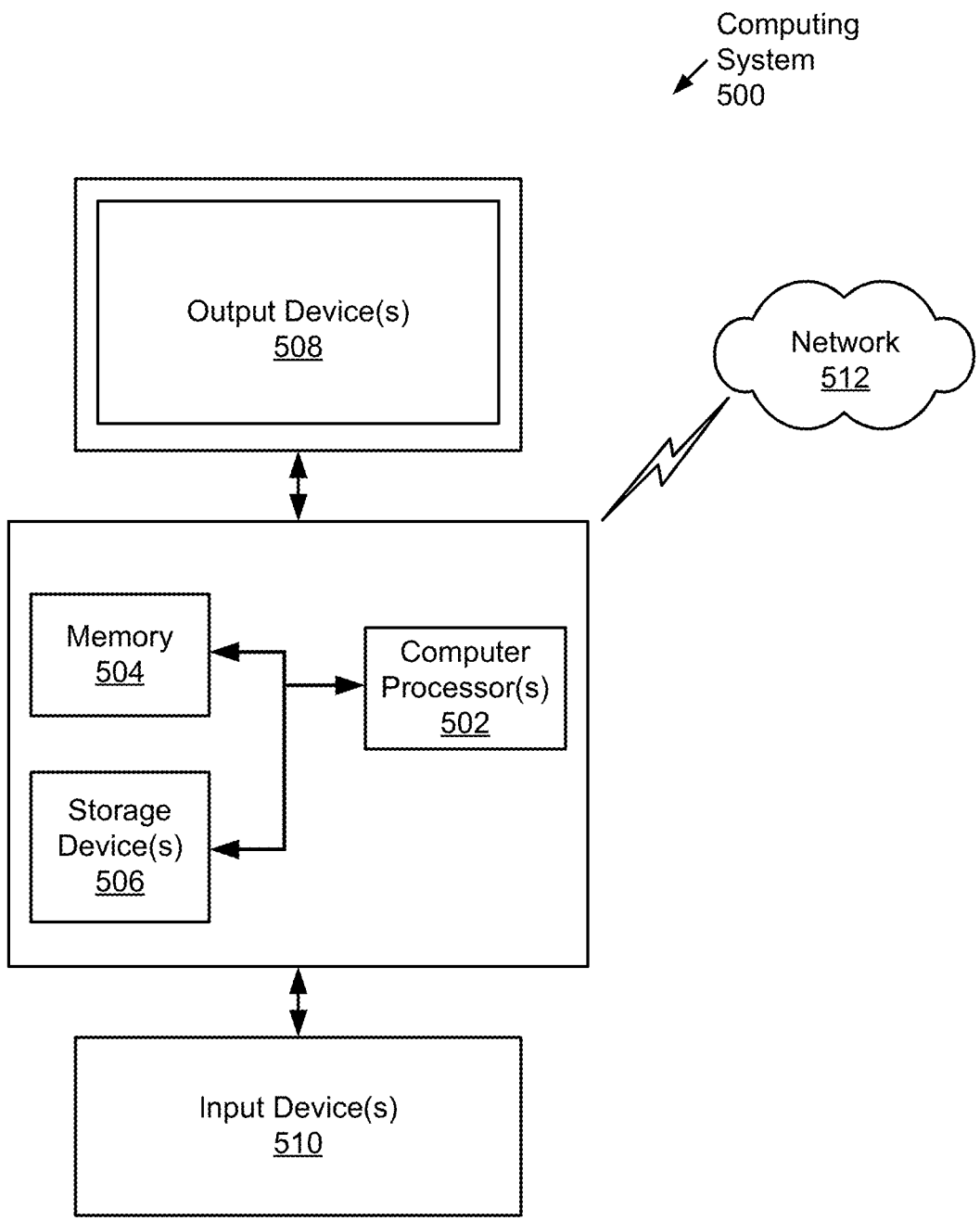
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an image comprising a table, the method comprising:
    obtaining a set of edges associated with a cell candidate of the table;
    determining a longest edge in the set of edges and a first orientation of the longest edge;
    determining, in the set of edges, an initial edge for a first cell border comprising the first orientation and the longest edge;
    building the first cell border based on the initial edge, the first orientation, and the set of edges;
    calculating a second orientation for a second cell border by rotating the first orientation;
    building the second cell border based on an initial edge for the second cell border and the second orientation; and
    validating the cell candidate as a cell of the table in response to building the first cell border and building the second cell border,
    wherein determining the initial edge for the first cell border comprises:
        initiating a trace of preceding edges of the longest edge in the set of edges;
        determining a third orientation of a preceding edge encountered during the trace; and
        searching for the initial edge of the first cell border in response to the third orientation being one counterclockwise turn from the first orientation and exceeding a minimum length threshold.

2. The method of claim 1, wherein building the first cell border comprises:
    initiating a tracing of the set of edges starting with the initial edge of the first cell border;
    adding a subset of the set of edges encountered during the tracing to a local oriented edges data structure; and
    searching for the initial edge of the second cell border in response to encountering, during the tracing, an edge comprising the second orientation and exceeding a minimum length threshold.

3. The method of claim 2, wherein searching for the initial edge of the second cell border comprises:
    searching a subset of the local oriented edges data structure for a vertex comprising a degree of at least 3.

4. The method of claim 3, further comprising:
    identifying a plurality of edges in the local oriented edges data structure comprising a vertex comprising a degree of at least 3; and
    selecting a first edge in the plurality of edges comprising an orientation that differs from the first orientation.

5. The method of claim 2, further comprising:
    removing, from the local oriented edges data structure, the edge comprising the second orientation and exceeding the minimum length threshold.

6. The method of claim 5, further comprising:
    incrementing a visited edge count by a cardinality of the local oriented edges data structure; and
    comparing the visited edge count by a cardinality of the set of edges,
    wherein building the second cell border and validating the cell candidate are based on the visited edge count being less than the cardinality of the set of edges.

7. The method of claim 1, further comprising:
    generating an electronic document comprising markup based on the cell,
    wherein the image comprises a writing board, and the table is hand-drawn on the writing board with a marker.

8. A non-transitory computer readable medium (CRM) storing computer readable program code for processing an image comprising a table embodied therein when executed by a processor:
    obtains a set of edges associated with a cell candidate of the table;
    determines a longest edge in the set of edges and a first orientation of the longest edge;
    determines, in the set of edges, an initial edge for a first cell border comprising the first orientation and the longest edge;
    builds the first cell border based on the initial edge, the first orientation, and the set of edges;
    calculates a second orientation for a second cell border by rotating the first orientation;
    builds the second cell border based on an initial edge for the second cell border and the second orientation; and
    validates the cell candidate as a cell of the table in response to building the first cell border and building the second cell border, wherein determining the initial edge for the first cell border comprises:
  initiating a trace of preceding edges of the longest edge in the set of edges;
  determining a third orientation of a preceding edge encountered during the trace; and
  searching for the initial edge of the first cell border in response to the third orientation being one counterclockwise turn from the first orientation and exceeding a minimum length threshold.

9. The non-transitory CRM of claim 8, wherein building the first cell border comprises:
  initiating a tracing of the set of edges starting with the initial edge of the first cell border;
  adding a subset of the set of edges encountered during the tracing to a local oriented edges data structure; and
  searching for the initial edge of the second cell border in response to encountering, during the tracing, an edge comprising the second orientation and exceeding a minimum length threshold.

10. The non-transitory CRM of claim 9, wherein searching for the initial edge of the second cell border comprises:
  searching a subset of the local oriented edges data structure for a vertex comprising a degree of at least 3.

11. The non-transitory CRM of claim 10, wherein the non-transitory CRM further stores computer readable program code that:
  identifies a plurality of edges in the local oriented edges data structure comprising a vertex comprising a degree of at least 3; and
  selects a first edge in the plurality of edges comprising an orientation that differs from the first orientation.

12. The non-transitory CRM of claim 8, wherein the non-transitory CRM further stores computer readable program code that:
  generates an electronic document comprising markup based on the cell,
  wherein the image comprises a writing board, and the table is hand-drawn on the writing board with a marker.

13. A system for processing an image comprising a table, the system comprising:
  a memory;
  a computer processor connected to the memory that:
    obtains a set of edges associated with a cell candidate of the table;
    determines a longest edge in the set of edges and a first orientation of the longest edge;
    determines, in the set of edges, an initial edge for a first cell border comprising the first orientation and the longest edge;
    builds the first cell border based on the initial edge, the first orientation, and the set of edges;
    calculates a second orientation for a second cell border by rotating the first orientation;
    builds the second cell border based on an initial edge for the second cell border and the second orientation; and
    validates the cell candidate as a cell of the table in response to building the first cell border and building the second cell border,
  wherein determining the initial edge for the first cell border comprises:
    initiating a trace of preceding edges of the longest edge in the set of edges;
    determining a third orientation of a preceding edge encountered during the trace; and
    searching for the initial edge of the first cell border in response to the third orientation being one counterclockwise turn from the first orientation and exceeding a minimum length threshold.

14. The system of claim 13, wherein building the first cell border comprises:
  initiating a tracing of the set of edges starting with the initial edge of the first cell border;
  adding a subset of the set of edges encountered during the tracing to a local oriented edges data structure; and
  searching for the initial edge of the second cell border in response to encountering, during the tracing, an edge comprising the second orientation and exceeding a minimum length threshold.

15. The system of claim 14, wherein searching for the initial edge of the second cell border comprises:
  searching a subset of the local oriented edges data structure for a vertex comprising a degree of at least 3.

16. The system of claim 15, wherein the processor further:
  identifies a plurality of edges in the local oriented edges data structure comprising a vertex comprising a degree of at least 3; and
  selects a first edge in the plurality of edges comprising an orientation that differs from the first orientation.

17. The system of claim 13, wherein the processor further:
  generates an electronic document comprising markup based on the cell,
  wherein the image comprises a writing board, and the table is hand-drawn on the writing board with a marker.

\* \* \* \* \*